Feb. 4, 1964        E. W. HOWLAND        3,120,349
ILLUMINATING MEANS FOR INSTRUMENTS
Filed May 11, 1962

INVENTOR.
EARL W. HOWLAND
BY
Beau, Brooks, Buckley & Beau
ATTORNEYS

United States Patent Office 3,120,349
Patented Feb. 4, 1964

3,120,349
ILLUMINATING MEANS FOR INSTRUMENTS
Earl W. Howland, 1540 Elmwood Ave., Buffalo 7, N.Y.
Filed May 11, 1962, Ser. No. 194,018
2 Claims. (Cl. 240—2.1)

This invention relates to illuminating means in general and pertains more particularly to the art of illuminating instruments, particularly instruments such as are used in aircraft and the like.

In illuminating instruments particularly for military purposes, and especially in military aircraft, certain problems are encountered which usually results in the utilization of external illuminating means which is, at best, inadequate under varying conditions of usage. Frequently, the lighting or illuminating systems employed are inadequate to provide even illumination across the face of the instrument sought to be illuminated and in many cases glare is a problem, not only from the source of illumination but by reflection from the face of the instrument sought to be illuminated. Obviously, these problems could be eliminated by employing conventional procedures in the illuminating art. However, among other things, maximum space available for the incorporation of illuminating means within the instrument or in association therewith is very strictly limited by the military specifications and for this reason alone, conventional illumination practice cannot be employed. It is, therefore, of primary consideration in connection with the present invention to provide illuminating means particularly for aircraft instruments and the like which will provide adequate illumination without glare and which will distribute such illumination evenly over the face of the instrument without requiring encroachment upon the space limitations allotted to the bezel portion of the instrument or any other dimensional characteristics thereof.

It is a further object of this invention to provide an improved bezel assembly for use in conjunction with aircraft instruments and the like wherein the bezel is so constructed and arranged as to provide a mount for illuminating means circumferentially spaced around the instrument face with which the bezel is to be associated, the bezel being also so constructed and arranged as to provide improved non-glare illumination of such instrument face.

Still another object of this invention is to provide an improved bezel assembly as aforesaid wherein the bezel is provided with means for receiving an annular transparent ring circumscribing the area to be illuminated and wherein such ring is of prismatic cross section, the bezel being so constructed as to cooperate to present fans of light to be projected through such ring and thence deflected downwardly upon the face of the associated instrument.

Another object of this invention is to provide an improved bezel assembly for aircraft instruments and the like wherein illuminating bulbs are mounted on the face of the bezel and are accessible for removal and replacement on the outer face of the bezel, the illuminating members or means being so arranged and cooperative with the bezel structure as to avoid increase in space requirements for the instrument.

Other objects and advantages of the invention will appear from the description hereinbelow and the accompanying drawing wherein.

Figure 1:
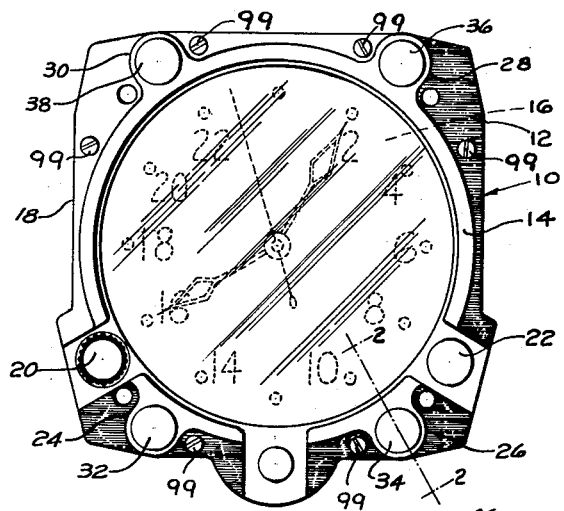
FIG. 1 is a front elevational view of an aircraft instrument provided with the improved bezel according to the present invention.

Referring now more particularly to FIG. 1, the bezel is indicated generally therein by the reference character 10 and will be seen to consist of an essentially annular body 12 provided with a raised inner rim portion 14 and adapted to be mounted by suitable means upon the body of an aircraft instrument, the face of which is designated at 16 in FIG. 1. In the specific structure shown, a chronometer is the specific form of aircraft instrument with which the bezel 10 is associated, it being understood that the principle of this invention can be practiced in accord and in conjunction with various types of instruments and not being necessarily limited to instruments for aircraft.

The outline 18 for the bezel remains unchanged as compared with the maximum dimensions permitted with the specific type of instrument with which the bezel is associated, as may be established for example by military specifications. The bezel itself is provided with any suitable structural characteristics which cooperate with the particular type of instrument with which it is associated, for example it may be provided with means accommodating the winding knob 20 and the setting knob 22 and the like for the associated instrument. Additionally, the bezel is provided with a series of boss portions 24, 26, 28 and 30 within which are mounted a series of illuminating means indicated by reference characters 32, 34, 36 and 38.

Figure 2:
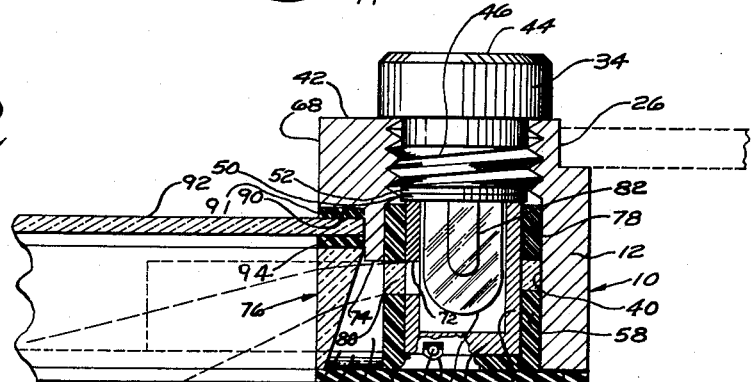
FIG. 2 is an enlarged sectional view taken substantially along the plane of section line 2—2 in FIG. 1 and showing details of the bezel construction and of the mounting means for one of the illuminating bulbs.

As is shown most clearly in FIG. 2, the body 12 of the bezel is provided with a bore 40 therethrough at each of the bosses 24, 26, 28 and 30, the bore being threaded in the region of the outer face 42 of the bezel and each of the illuminating means is, as is shown in FIG. 2 for the illuminating means 34, of conventional construction, being provided with an enlarged head portion 44, a threaded stem portion 46 and a bulb portion 48. The threaded portion 46 forms the ground contact for the bulb 48 and the shoulder portion 50 provides the other electrical contact for the bulb, such portion 50 being insulated from the stem portion 46 by means of a suitable insulating washer 52. It is to be understood, however, that the principles of the present invention are adaptable to other and different forms and types of illuminating means.

As can be seen from FIG. 2, the body 12 of the bezel itself forms the ground contact for the threaded stem portion 46 of the illuminating means in each case and in order to provide electrical contact for the shoulder portion 50 of each illuminating bulb, a metallic sleeve member 56 is provided within each of the bores 40. Each such sleeve, as will be seen from FIG. 2, is open at its top so that the upper edge may be engaged by the shoulder 50 and make contact therewith. Further, each such sleeve 56 is surrounded by an insulating sleeve 58 which snugly seats within the associated bore 40 in the body 12, the metallic sleeve 56 being snugly fitted in turn within the insulating sleeve 58. The two sleeves 56 and 58 are provided with suitable bottom walls 60 and 62 as shown and preferably the lower face of the bottom wall 62 of the insulating sleeve 58 is flush with the bottom surface 64 of the bezel 10.

Figure 3:
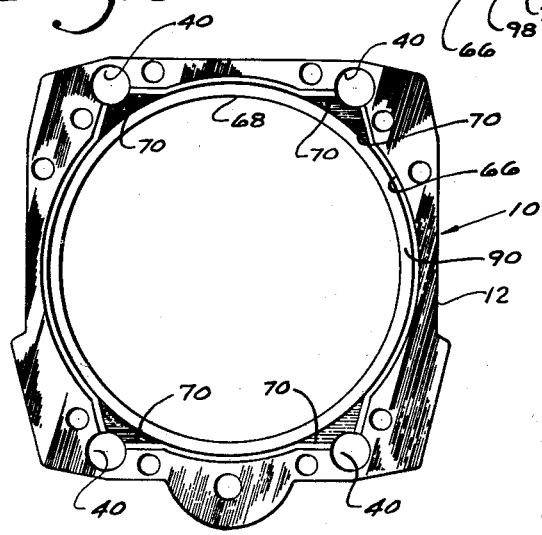
FIG. 3 is a rear plan view of the bezel as removed from the instrument with which it is associated.

Referring now to FIG. 3 specifically, it will be seen that the bezel 10 is provided at its under or rear face with a counterbore 66 concentric with the central opening 68 of the bezel, the several bores 40 for receiving the illuminating means and their associated contact assemblies being closely spaced radially relative to the counterbore 66. The bezel is provided with a series of fan shaped slots 70, one associated with each bore 40 and, as can be seen in FIG. 2, the metallic sleeve 56 is provided with a suitable slot 72 having its upper or outer edge substantially flush with the upper or outer edge 74 of each associated slot 70. This relationship, in effect, forms a window for permitting light to pass from the illuminating bulb 48 in each case outwardly in fan spreading relationship through the annular transparent ring 76. To provide a window opening in the insulating sleeve, it is preferred that the lower portion thereof, as is designated by the reference character 58 in FIG. 2, be separately formed from the cylindrical upper portion 78 thereof so as to leave a gap therebetween. This gap may be filled by a diffusing annulus 80 formed of glass, plastic or like material for the purpose of softening or diffusing the light projected upon the instrument face.

It is preferred that the upper or outer sleeve or cylinder member 78 be adhesively secured to the metallic sleeve 56 and, likewise the sleeve 58 which is in effect a cap is preferably adhesively bonded to the metallic sleeve or thimble 56. Dimensionally, it is preferred that the length of the metallic sleeve 56 be such as to locate the filament 82 of each bulb substantially at the level of the upper edge 72 of the window slot so that light emanating from this window slot in the direction of the eyes of the viewer is largely obviated. On the other hand, to direct the fan shaped cone of light downwardly upon the instrument face, the ring member 76 is preferably of prismatic cross section and, preferably, the precise prismatic section is such as to direct the marginal rays of light such as substantially diametrically opposed illuminating means have slightly overlapping areas of illumination towards the center of the instrument face. In this fashion, and by utilizing a series of circumferentially arranged illuminating means, the entire face of the instrument may be substantially uniformly illuminated without the impingement of direct rays from the illuminating means into the eyes of the viewer.

Preferably, the ring member 76 is made of plastic material or any suitable substance having the requisite characteristics. The bezel 10 is provided with an additional counterbore 90 which serves to form a seat receiving the gasket 91, the cover glass 92, an annular gasket 94 and the ring 76, see particularly FIG. 2. Further, an annular gasket 96 is interposed between the body 12 of the bezel and the body of the instrument with which the bezel is associated, such body not being illustrated in the drawing, it being appreciated that suitable fasteners 99 (FIG. 1) are used to secure the bezel to the instrument body.

Figure 4:
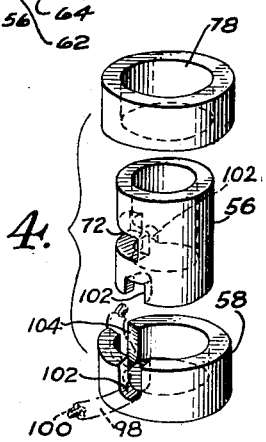
FIG. 4 is an exploded perspective of one form of light housing and insulating assembly.

For the purpose of providing electrical contact to the several metallic sleeves 56, a suitable conductor 98 is disposed within the confines of the counterbore 66 and bare end portions 100 of this conductor are fitted through suitable slots in the insulating cap 58 and into grooves 102 on the underside of the contact thimble 56 and suitably soldered or otherwise electrically connected thereto as is shown. Such relationship is illustrated in FIG. 4 wherein it will be seen that an optional form, eliminating the diffusing ring 80, may be employed. The grooves 102 in thimble 56 mate with slots 104 provided in the insulating member 58 to receive and provide clearance for the conductor 98.

It is to be understood that certain changes and modifications as illustrated and described may be made without departing from the spirit of the invention or the scope of the following claims.

I claim:
1. In an aircraft instrument and the like having a face to be illuminated,
a bezel mounted on said instrument and having an opening registering with the instrument face,
a cover glass received in said opening and spaced from the face of the instrument, to define a protected region therewith,
said bezel having a series of circumferentially spaced fan-shaped openings extending radially outwardly from said protected region, and a series of recesses extending inwardly from its outer face to intersect with corresponding of said fan-shaped openings,
a metallic sleeve received in each of said recesses and surrounded by insulating means isolating the sleeve from the bezel,
each sleeve and insulating means having registering openings defining a window at the intersection between a corresponding recess and fan-shaped opening,
an illuminating bulb received in each recess and having its filament disposed proximate to a corresponding window,
and an annular member disposed in surrounding relation to said protected region,
said member being transparent and having a prismatic cross section.

2. In an aircraft instrument or the like,
a bezel of generally annular form presenting an enlarged central opening for exposing the face of an associated instrument,
said bezel having a counterbore for receiving the marginal edge of a cover glass,
a transparent annular member of prismatic cross section received in said counterbore,
said bezel having a series of bores therethrough disposed in circumferentially spaced relation to each other and being spaced radially outwardly of said counterbore,
said bezel having a fan-shaped opening leading from each bore to the counterbore,
an insulating sleeve in each of said bores,
a metallic sleeve received in each insulating sleeve and the metallic and insulating sleeves having registering openings at the intersection of each bore and fan-shaped opening to define a light-transmitting window thereat.

References Cited in the file of this patent
UNITED STATES PATENTS

| | | |
|---|---|---|
| 2,259,910 | Rylsky | Oct. 21, 1941 |
| 2,262,920 | Carbonara | Nov. 18, 1941 |
| 2,290,284 | Klein et al. | July 21, 1942 |
| 2,723,342 | Neugass | Nov. 8, 1955 |